(12) United States Patent
Rama et al.

(10) Patent No.: US 11,151,002 B2
(45) Date of Patent: Oct. 19, 2021

(54) COMPUTING WITH UNRELIABLE PROCESSOR CORES

(71) Applicant: International Business Machines Corporation, Armonk, NY (US)

(72) Inventors: Saketh V. Rama, Somerville, MA (US); Augusto Vega, Mount Vernon, NY (US); Alper Buyuktosunoglu, White Plains, NY (US); Pradip Bose, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 16/377,131

(22) Filed: Apr. 5, 2019

(65) Prior Publication Data
US 2020/0319981 A1 Oct. 8, 2020

(51) Int. Cl.
G06F 11/16 (2006.01)
G06F 11/30 (2006.01)
G06F 11/18 (2006.01)
G06F 11/00 (2006.01)

(52) U.S. Cl.
CPC ........ *G06F 11/1637* (2013.01); *G06F 11/004* (2013.01); *G06F 11/165* (2013.01); *G06F 11/186* (2013.01); *G06F 11/3006* (2013.01)

(58) Field of Classification Search
CPC .. G06F 11/1637; G06F 11/004; G06F 11/165; G06F 11/186; G06F 11/3006
See application file for complete search history.

(56) References Cited

U.S. PATENT DOCUMENTS

| 5,016,249 | A  | * | 5/1991  | Hurst ...... | B60T 8/885 |
| | | | | | 714/11 |
| 7,506,216 | B2 | | 3/2009  | Bose et al. | |
| 8,799,194 | B2 | | 8/2014  | Duggirala et al. | |
| 10,767,994 | B2 | * | 9/2020  | Oka ...... | G01C 21/265 |
| 2006/0059392 | A1 | * | 3/2006  | Kizer ...... | G06F 11/004 |
| | | | | | 714/704 |
| 2006/0282702 | A1 | * | 12/2006 | Bando ...... | G06F 11/165 |
| | | | | | 714/11 |
| 2009/0249034 | A1 | * | 10/2009 | Sato ...... | G06F 9/3857 |
| | | | | | 712/214 |

(Continued)

OTHER PUBLICATIONS

J. Von Neumann, "Probablistic logics and the synthesis of reliable organisms from unreliable components," Automata studies, vol. 34, pp. 43-98, 1956.

(Continued)

*Primary Examiner* — Matthew M Kim
*Assistant Examiner* — Matthew N Putaraksa
(74) *Attorney, Agent, or Firm* — Kurt Goudy; Lou Percello, Attorney, PLLC

(57) ABSTRACT

A computer system that has two or more processing engines (PE), each capable of performing one or more operations on one or more operands but one or more of the PEs performs the operations unreliably. Initial results of each operation are debiased to create a debiased result used by the system instead of the initial result. The debiased result has an expected value equal to a correct output where the correct output is the initial result the respective operation would have produced if the respective operation performed was reliable.

20 Claims, 6 Drawing Sheets

(56) References Cited

U.S. PATENT DOCUMENTS

| | | | |
|---|---|---|---|
| 2012/0269451 A1* | 10/2012 | Luo | H04N 19/527 382/236 |
| 2012/0304024 A1* | 11/2012 | Rohleder | G06F 9/38 714/49 |
| 2012/0304184 A1 | 11/2012 | Yamashita et al. | |
| 2016/0026741 A1 | 1/2016 | Kuwamura | |
| 2020/0177302 A1* | 6/2020 | Nikitopoulos | H04L 1/0003 |
| 2020/0320975 A1* | 10/2020 | Spata | G10L 15/01 |

OTHER PUBLICATIONS

E. F. Moore and C. E. Shannon, "Reliable circuits using less reliable relays," Journal of the Franklin Instituye, vol. 262, No. 3, pp. 191-208, 1956.

J. George et al., "Probablistic arithmetic and energy efficient embedded signal processing," in Proc. of the 2006 Int'l. Conf. on Compilers, Architecture and Synthesis for Embedded Systems, ACM, 2006, pp. 158-168.

J. A. Cooper, "The application of constrained mathematics in probabilistic uncertainty analysis," 18th International Conference of the North American Fuzzy Information Processing Society—NAFIPS (Cat. No.99TH8397), New York, NY, USA, 1999, pp. 95-99.

Semeen Rehman, Muhammad Shafique, Florian Kriebel, and Jörg HENKEL, "Reliable software for unreliable hardware: embedded code generation aiming at reliability," In Proceedings of the seventh IEEE/ACM/IFIP international conference on Hardware/software codesign and system synthesis (CODES+ISSS '11). ACM, New York, NY, USA, 237-246.

Alessandro Saving, Stefano Di Carlo, Gianfranco Politano, Alfredo Benso, Alberto Bosio, and Giorgio Di Natale, "Statistical reliability estimation of microprocessor-based systems," IEEE Transactions on Computers 61, No. 11 (2012): 1521-1534.

Alexandre Yasuo Yamamoto and Cristinel Ababe, "Unified reliability estimation and management of NoC based chip multiprocessors," Microprocessors and Microsystems 38, No. 1 (2014): 53-63.

* cited by examiner

Figure 2

| Core/PE 150 (i) 210 | Operation 220 | Per-PE Reliability, Pr(i) 230 | Per-PE Mean, Bo(i) 240 |
|---|---|---|---|
| Core 1 | Addition | R1A | B1A |
| Core 1 | Multiplication | R1M | B1M |
| Core 1 | Shift bits | R1S | B1S |
| Core i | Addition | RiA | BliA |
| Core i | Multiplication | RiM | BiM |
| Core i | Shift bits | RiS | BiS |
| Core n | Multiplication | RnM | BnM |
| Core n | Shift bits | RnS | BnS |

COMPUTING WITH UNRELIABLE PROCESSOR CORES

STATEMENT REGARDING FEDERALLY SPONSORED RESEARCH OR DEVELOPMENT

This invention was made with Government support as sponsored by the Defense Advanced Projects Agency (DARPA) under contract #HR0011-13-C-0022. The Government has certain rights to this invention.

BACKGROUND

The present invention relates to computing systems with multiple processing engines (PEs,) e.g., processors and/or processor cores. More specifically, the invention relates to transforming computer systems to become more reliable when one or more PEs in the system is unreliable.

In the late Complementary Metal Oxide Semiconductor (CMOS) design era (7 nm and beyond) there is increasing concern that component-level yield and in-field reliability may both be compromised. Accordingly, multiple processor systems, including many-core processor (chip) designs, can be expected to have processors and/or cores (PEs) that behave unreliably. These systems may need to rely much more heavily on algorithm/application level, logic/circuit level, and system architecture level support to ensure acceptably reliable results from computing systems.

Current solution approaches rely on error-detection and error-correction codes supplemented, where applicable, by massively redundant operations to achieve targeted system reliability. Often, such solutions assume 100% reliability on some centralized core (checker or voter) unit. The area and power overhead, coupled with centralized "single point of failure" attributes make such approaches impractical for future many processor, including many-core, systems (e.g. systems consisting of hundreds and thousands of cores per chip).

Traditional redundant architectural models (e.g. nMR or n-modular redundancy—where n=2 or larger) incur overheads that are not affordable in commodity (low cost) embedded or server processor systems.

Some systems rely on specially hardened circuits for certain resources (often centralized) that provide checking or voting operations. Such methods inhibit scalability in future many-core designs.

As such, there is a need for low-cost affordable architectural solution strategies for systems with high numbers of PEs that meet application level reliability expectations. There is also a need for large, scalable systems with large numbers of PEs that effectively provide acceptable levels of reliability—as an example for specialized application domains (e.g. linear algebra operations.)

SUMMARY

One preferred embodiment of the present invention is a computer system that has two or more up to thousands of processing engines (PE.) Each PE can perform one or more operations on one or more operands. Each operation performed by each of the PEs produces an initial result but at least one or more of the operations is unreliable. The system has one or more data structures storing a pair of debiasing values for each operation performed by each of one or more PEs in the system. The debiasing value pairs include a per-PE reliability and a per-PE mean. A de-biaser selects a selected debiasing value pair that is associated with a respective operation performed on a respective PE. The system uses the selected debiasing value pair to transform the initial result of each operation into a debiased result. The debiased result has an expected value equal to a correct output. In a preferred embodiment, the correct output is the initial result the respective operation would have produced if the respective operation performed was reliable. Methods for controlling the system and determining the debiasing value pairs are included.

BRIEF DESCRIPTION OF THE DRAWINGS

FIG. 2 is a block diagram of a non-limiting example of a data structure storing a plurality of debiasing value pairs.

DETAILED DESCRIPTION

Figure 1:
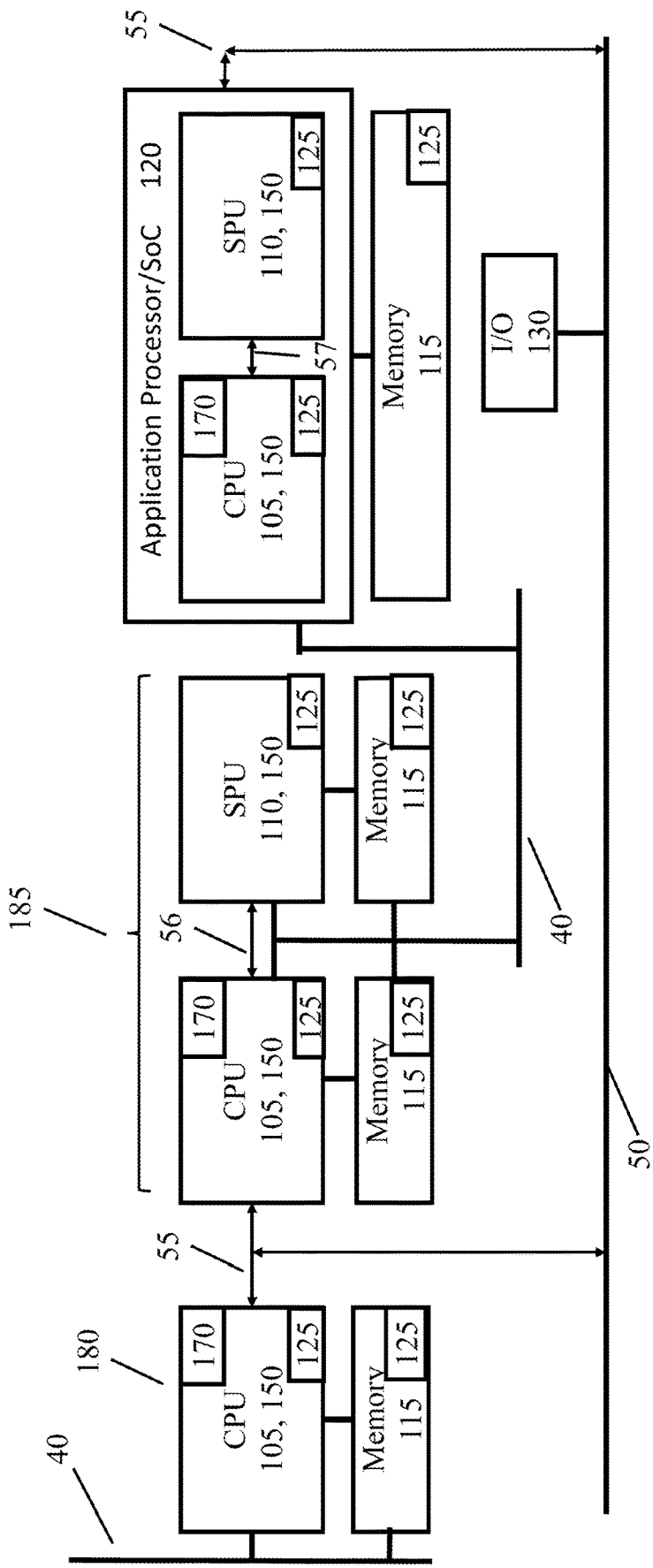
FIG. 1 is a block diagram of alternative preferred system architectures embodying the present invention.

This invention deals with the problem of achieving computational results in systems with many-processor and/or many-cores (PEs) that meet targeted expectations of application-level reliability, while relying on processing engines that are inherently unreliable. Particularly, where post-7 nm technology in CMOS enables many cores per chip, there is increasing concern about yield and in-field reliability of one or more of these cores behaving unreliably. While there has been increasing reliance on circuit, architecture and application/algorithm level support for reliability (failure mitigation) in late CMOS era designs, these solutions are expensive (e.g. in overheads like chip area, energy use, and system performance), particularly as the numbers of cores per chip scale upward. In addition, to preserve the economics of scaling, many-core designs of the future will likely depend on computational methods/techniques to achieve targeted application-level reliability that are partially-redundant and have low overhead.

Such systems have non-limiting uses in the context of machine learning (ML) and deep learning (DL) acceleration, among other uses.

In preferred embodiments, the present invention is a system of two or more basic processing engines (PEs) and includes systems with up to thousands of PEs. In some preferred embodiments, the PEs are individual processors on a chip or board and/or used in a computer system, e.g. a general-purpose computer and/or server. In other preferred embodiments, the PEs are cores within a single semiconductor chip. In still other preferred embodiments, the PEs can perform special purpose functions like floating point calculations (a floating-point unit—FPU), graphical processing (graphical processing unit—GPU), and/or Basic Linear Algebra Subroutine (BLAS.) In preferred embodiments, there are multiple instantiations and/or combinations of these embodiments.

In alternative preferred embodiments, the PEs perform operations that produce (initial) results that are shared with one or more other PEs in the computer system over connections that enable communication between and among the PEs. In some embodiments the invention maybe used in networking application where the PEs are communicating data with one another over reliable communication connections. In some embodiments, there may be dozens, hundreds, or even thousands of cores functioning as PEs in a single system and/or chip. In this disclosure PEs and cores will be used interchangeably without loss of generality.

As a non-limiting example, consider a many-core chip in the post-7 nm CMOS regime. In order to preserve the basic economics of scaling in the deep sub-micron era, it is likely that some (if not all) of the basic processing engines (PEs) of such a chip may not be fully trustworthy, in terms of computational fidelity. Without loss of generality, let us assume that the PEs are basic multiply-accumulate (MAC) engines, capable of executing multiply and add instructions. Such MAC functions form the core of matrix-vector arithmetic or linear algebra.

In a preferred embodiment, a many-core architecture is envisioned as one or more specialized systems. As a non-limiting example, the many-core architecture is embodied in a Basic Linear Algebra Subroutine (BLAS) accelerator chip. These BLAS systems are designed to execute BLAS subprograms which are primitive operations used for numerical (linear algebra) calculations that are used in a vast number of scientific computer calculations, including machine learning (ML) and deep learning (DL) based applications.

Other non-limiting examples are envisioned. For instance, a multi-core system using the present invention can be used in a Floating-Point Unit (FPU,) a Graphical Processing Unit (GPU,) and/or any other general-purpose function performed by a PE.

A "Redundant Debiased" method is introduced that determines and introduces a probabilistic margin of error as a result of the PEs performing/computing each of one or more of the operations, e.g. addition, multiplication, subtraction, division, bit shifting, and/or any combination of the foregoing. In a preferred embodiment, the architecture of the system includes memory locations/structures, e.g. registers and/or a bank of registers, that contain one or more pairs of debiasing values. There is one pair of debiasing values for each operation performed by each one of the PEs. The two biasing values in each biasing value pair are: i. a per-PE reliability and ii. a per-PE mean/average of faulty values (per-PE mean.)

In preferred embodiments, there is a "debiasing function" or de-biaser that identifies a respective core and a respective operation being performed by the respective PE to produce an initial result. The debiaser selects a debiasing value pair associated with the respective operation/PE and uses the selected debiasing value pair to transform the initial result into a debiased result.

The debiased result replaces the initial result determined by the respective core performing the respective operation and the debiased result is communicated to and used by the other PEs and/or other system components instead of the initial result. In like manner, each of one or more operations performed by each of one or more PEs in the system has its initial results transformed into a debiased result that is used to transform the system and/or other PEs in the system.

In this manner, the entire system is reconfigured and transformed to operate using debiased results derived from the initial results produced by PEs in the system.

By transforming the system to use the debiased results of the operations performed by each of the PEs, over a large number of computations the entire system performance achieves an overall expected result at a system level with a given application within an acceptable error margin even though one or more of the cores performs one or more of the operations unreliably. Therefore, in preferred embodiments, the overall system output and/or results of the system are dependent on the debiasing value pairs for each operation performed by each of the PEs. In preferred embodiments these operations include one or more of the following: addition, subtraction, multiplication, division, bit shifting, and/or any derivations of the foregoing including by not limited to matrix operations and/or neural network operations. In some preferred embodiments a large number of computations or operations would be more than 10,000 instantiations of an operation. In a more preferred embodiment, the number of operations would be greater than $10^5$, or $10^3$ in a more preferred embodiment, assuming a normal distribution.

In some preferred embodiments, one or more of the debiasing value pairs is determined offline using a data set. The data set can have real data and/or synthetic data. In a preferred embodiment, a series of compute checks is done on the data set, e.g. pair-wise compute checks as described below, to determine the per-PE reliability and per-PE mean of each of one or more of the debiasing value pairs. These debiasing value pairs are then used as constants by the debiaser to determine the debiased values used in the future operations of the system.

Over a sufficiently large ensemble of each of the operations that the system performs, the expected level of accuracy of the respective operation performed by the system is preserved. In a preferred embodiment, the method and associated system-level architectural transformation is used as an acceptably approximate computing engine as a hardware accelerator for applications like deep neural network-based training and/or classification. The expected accuracy and variance may be determined for specific classes of fault models (e.g., unimodal distributions) through standard analytical models or simulations.

In a system with one or more unreliable PE's performing these operations, the computed value of such an instruction by an unreliable PE is not guaranteed to match the value that is expected from the hardware functional specification of those instructions. In other words, the initial result of each operation (e.g., arithmetic instruction) executed by a given PE/core (i) has a probability of correct execution equal to Pr(i). Accordingly, there is a probability of 1-Pr(i) that the given PE, i.e. unreliable processor, generates a result which is incorrect, and the incorrect initial result is assumed to be drawn from a random variable whose value range spans the full valid range of possible values. No a-priori constraint is placed on the probability distribution obeyed by the random variable referred to above. The probability [1-Pri)] of an incorrect initial result is unrelated to the operands used in the operation.

In a scenario where the PEs (cores) are executing a very large number of each of the operations (e.g. the set of adds, subs, multiplies, divides, shifts, etc.), the invention ensures that the expected value (or system or ensemble average) of the computed values matches the correct expected average—even if individual computations at the PE (core) level are not generated correctly all the time; i.e. even if Pr(i)<1 for some or all PE's, i. The system is transformed to operate in this manner.

In a preferred embodiment, once the system is transformed there is an assurance about the expectation (or ensemble/system average) of the computed values by the system (e.g. chip and/or system) that a class of applications (including those within the ML/DL space) can produce acceptably accurate inference/classification models generated from very large data sets.

Therefore, some preferred embodiments of the present invention used in non-limiting applications for the invention Floating Point Units (FPU's), BLAS, linear algebra, and neural network accelerator processors enable low cost and accurately functioning hardware even though there are one or more faulty calculation paths/PEs to be used in these application specific domains.

FIG. 1 is a block diagram of alternative preferred system architectures embodying the present invention.

In general, each of these systems has one or more PEs, (e.g., a central processing unit, CPU 105 or a special purpose processing unit 110), a data structure 125, a debiaser 170, and one or more memories 115. The data structure 125 and/or the debiaser 170 are located in: one location, several locations, and/or distributed throughout the system. Typically, the systems 100 have an internal communication connection 55 that connects two or more of the PEs together through one or more internal interfaces, e.g. data buses 55. Embodiments of the system 100 have external network connections to external networks 50. Input/output devices 130, e.g. external storage, keyboards, voice inputs and outputs, graphical user interfaces, etc. are connected to various interfaces to the system 100. Power is brought to the system 100 through one or more power buses 40.

In non-limiting examples the PE 150 can be a CPU, one or more cores in the CPU (105, 150), a special purpose processing unit (SPU) (110, 150), and/or one or more cores acting as a SPU (110, 150.) As non-limiting examples, the SPU (110, 150) can be a co-processor, a math co-processor, a graphical processing unit (GPU), a floating point unit (FPU), a Basic Linear Algebra Subroutine (BLAS) accelerator, and any core in a processor (105, 150) performing any one or more of the foregoing functions, etc.

In some embodiments, any PE 150 can have one or more cores, each of which is a PE 150. For example, one or more CPUs 105 may have one or more cores, each core capable of executing one or more threads of instructions and/or performing one or more special functions, e.g. GPU, FPU, BLAS, etc. In some embodiments, a CPU 105 can have 4 to 8 cores up to thousands of cores 150.

In one embodiment 180, the system 100 comprises one or more CPUs 105 each with zero or more cores 150.

In an alternative embodiment 185, the system 100 comprises one or more CPUs 105 with one or more SPUs 100 with the CPUs and SPUs in communication 56. Each of these CPUs and SPUs can have zero or more cores 150.

In another alternative embodiment 120, the system 100 comprises a system on a single chip (SoC) and includes one or more CPUs 105 and zero or more SPUs 110 internally communicating 57 with one another. Each of these processors 150 can have one or more cores 150, as well. Memory 115 can be on board the SoC 120 and/or connected externally to the SoC 120. Versions of this system 120 can be disposed on larger substrates, wafers, boards, etc.

The system 100 can also be any combination of the above embodiments and/or other architectural configurations known in the art.

One or more data structures 125 reside on one or more of the memories (e.g. main memory, cashe memory, external memory, etc.) 115, PE's 150, and/or is distributed throughout the system 100. In preferred embodiments, the data structures 125 are memory registers The debiaser 170 is a process that can be executed by a system 100 operating system, as part of the operation one or more PE's, and/or as part of an application program running on the system 100.

Figure 3:
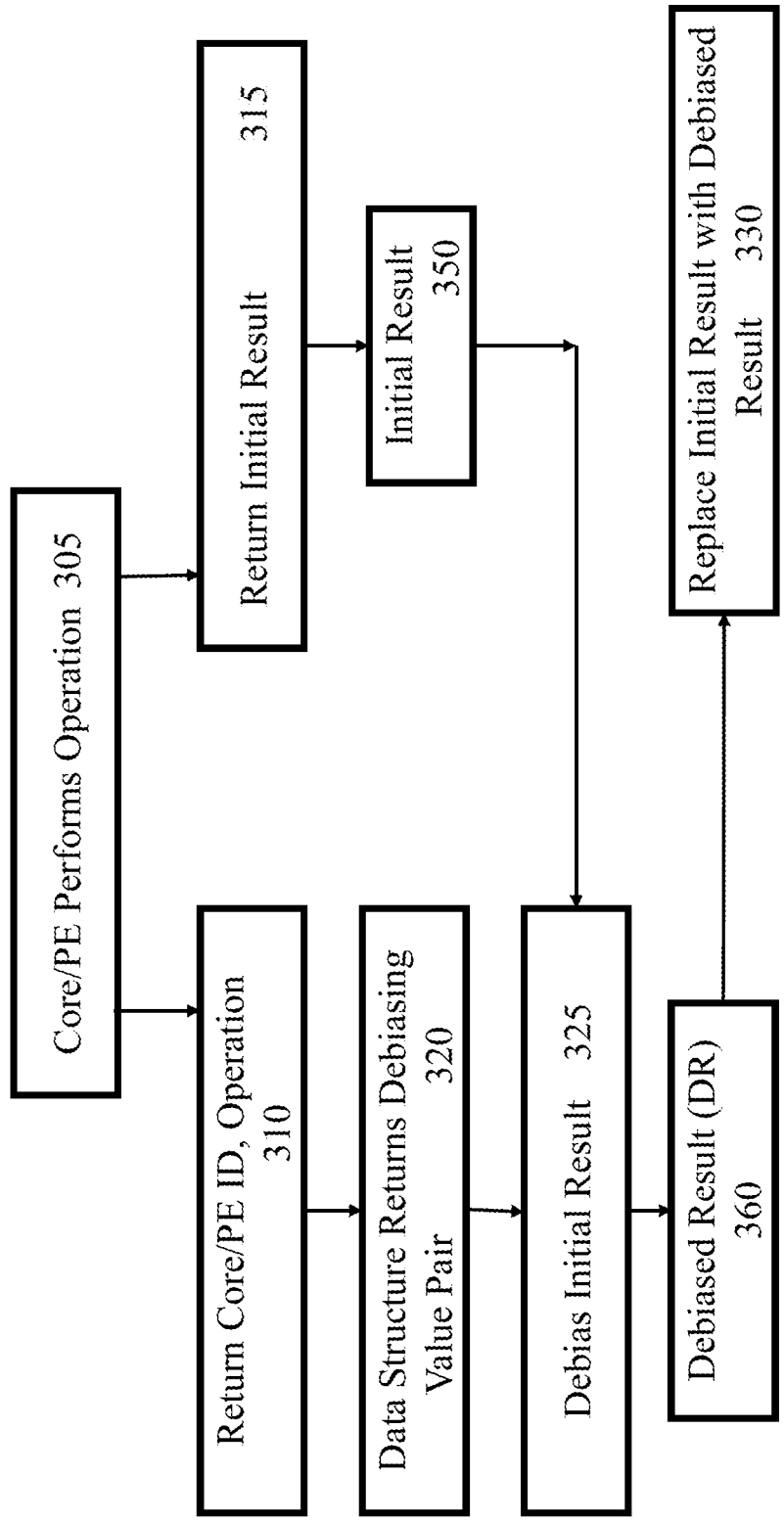
FIG. 3 is a flow chart of one preferred de-biaser process.

The de-biaser 170 selects a selected pair of debiasing values that is associated with a respective operation performed on a respective PE 150, the selected pair is used to transform the initial result of each operation into a debiased result. FIG. 3 is a flow chart of one preferred de-biaser process 170.

FIG. 2 is a block diagram of a non-limiting example of a data structure 125 storing a plurality of debiasing value pairs (230, 240.)

In this preferred embodiment, the database/data structure 125 has a plurality of records (e.g. 252, 254, 256, etc., typically 252) with 4 fields, typically 250. A first field 210 is a PE/core identifier 210, "i," for each of the cores/PEs 150, e.g. core (i), the i th core of "n" number of cores. A second field 220 is an operation 220 the identified core (i) 210 is performing. Example core/PE 150 operations include addition, subtraction, multiplication, division, bit shifting, and any of the operations that can be derived from combinations of the foregoing, e.g. square root or other arithmetic functions. A third field 230 is the per-core reliability 230 of the core/PE 150 identified in the record, typically 252, and the forth field 240 is the per-core mean of faulty values 240 of the core/PE 150 identified in the record 252. Only portions of the data structure 125 are show, with many of the records 252 not shown and represented by the ellipses, (i.e., . . . )

To further the explanation, records 252, 254, and 256 related to core/PE1 (where i=1.) Record 252 shows core/PE1 performing the operation 220 of addition and for the operation 220 of addition 220 having a per-core reliability 230 value of R1A and a per-core mean value 240 of B1A. Record 254 (256) shows core/PE1 having a per-core reliability 230 value of R1M (R1S) and a per-core mean 240 value of B1M (B1S) for the operation 220 of multiplication (shifting bits.)

More generally, any core/PE(i), e.g. as shown in records 262, 264, and 266, respectively has a per-core reliability 230 value of RiA, RiM, and RiS and a per-core mean 240 of BiA, BiM, and BiS, for the operations 220 addition, multiplication, and shifting bits, respectively.

In a preferred embodiment, values of per-core reliability 230 and per-core mean 240 are associated with each operation 220 performed by each core/PE 150 up to and including the last core/PE 150, i=n, in the system 100. As shown as non-limiting examples in records 272 and 274, core/PE(n) has a per-core reliability 230 value of RnM, and RnS and a per-core mean 240 of BnM and BnS, for the operations 220 multiplication, and shifting bits, respectively.

Alternate embodiments are envisioned and would become apparent to those skilled in the art given this disclosure. For example, records, e.g. 252, for a given core/PE 150 having fields 220, 230, and 240 can be associated with each core/PE 150 in registers dedicated to associated core. Alternatively, information stored in the data structure 125 can be distributed in memories 115 throughout the system 100.

FIG. 3 is a flow chart of one preferred de-biaser process 170.

The de-biaser process 170 begins when a core/PE (i) performs 305 an operation 220. The de-biaser process 170 returns 310 the PE/core identifier 210 for the core/PE 150 performing the operation 220 and the type of operation 220 along with returning 315 an initial result 350 of the performed 305 operation 220.

The initial result 350 (IR) can be represented by:

$$IR = a1 o(k) a2$$

where IR 350 is the initial result 350 of the operation 220, o(k), performed 305 by core/PE (i), 210 and a1 and a2 are a first and second operand of the operation 220, o(k) performed 305 by core/PE (i), 210.

Note that some or all the cores/PEs 150 might perform the operation 220, o(k), unreliably. Therefore, the initial result 350 may or may not be the correct result, c.

Step 320 of the debiaser process 170 uses the PE/core identifier 210 and the operation 220 performed by that PE (150, 210) to access the data structure 125 and return 320 the debiasing value pair (230, 240) associated with the operation 220 performed by the PE/core 150.

In step 325, the debiaser process 170 debiases 325 the initial result 350 using the debiasing value pair (230, 240), e.g. the value of the per-core reliability 230, Pr(i) and the value of the per-core mean, Bo(i).

In a preferred embodiment, the initial result, IR(i), is debiased 325 to obtain a debiased result (DR) 360 by:

$$DR(i)=IR*Pr(i)+Bo(i)=[a1o(k)a2]*Pr(i)+Bo(i)$$

where DR(i) 360 is the resulting debiased result 360.

In step 330, the debiased result (DR) 360 replaces the initial result (IR) 350 so that the debiased result 360 is used by the system 100 instead of the initial result 350. In this manner, the system 100 is transformed to work with different, debiased results 360 on a plurality of the cores/PEs 150 of the system 100 for each of one or more of the operations 220 that the system 100 cores/PEs 150 perform 305.

This debiasing 325 and replacement 330 of the initial results 350 with the debiased result 360 improves the operation of the system 100 and permits operation of the system to produce system results within a system tolerance of an expected value, even when one or more of the cores/PEs 150 is behaving unreliably. In a preferred embodiment of the invention, the expected value of the results, outcomes, and performance of the system 100 will be equal the results, outcomes, and performance of the system 100 if all the cores/PEs performed reliably with accurate initial results 350 for any and all operations 220.

As a non-limiting example, the expected value of the debiased results 360 is shown to be equal to the correct result, c, for a large number of operations 220 as follows:

If we assume that the initial result 350 provided by an unreliable core/PE 150 is offset from the correct result, c, by the per-core mean error, divided by the per-core reliability, Pr(i), we have $$IR(i)=a1o'(k)a2=[a1o(k)a2-Bo(i)]/Pr(i)=[c-Bo(i)]/Pr(i)$$

where c is the correct value of the operation, o(k) 220, performed by core/PE 150 and o'(k) represents an unreliable and/or faulty operation 220 performed by the core/PE 150.

Substituting the "unreliable" initial result, IR(i) 350 into the debiasing initial results step 325 of the debiasing process 170 yields:

$$DR(i)=\{[c-Bo(i)]/Pr(i)\}*Pr(i)+Bo(i)=c$$

where the term $\{[c-Bo(i)]/Pr(i)\}*Pr(i)$ is the expected value of the operation 220, E$\{[c-Bo(i)]/Pr(i)\}$, of the initial result 350 which is then offset by the per-core mean 240 error to yield a debiased result 360 equal to the correct result, c.

In a preferred embodiment, the value of the per-core reliability, Pr(i), 230 for each operation 220 of each core/PE 150 is estimated by a pairwise matching procedure 400. The per-core mean, Bo(i), 240 value for each operation 220 of each core/PE 150 is estimated by taking the mean value of a plurality of zero result operations 220 performed for each operation 220 of each core/PE 150.

Figure 4:
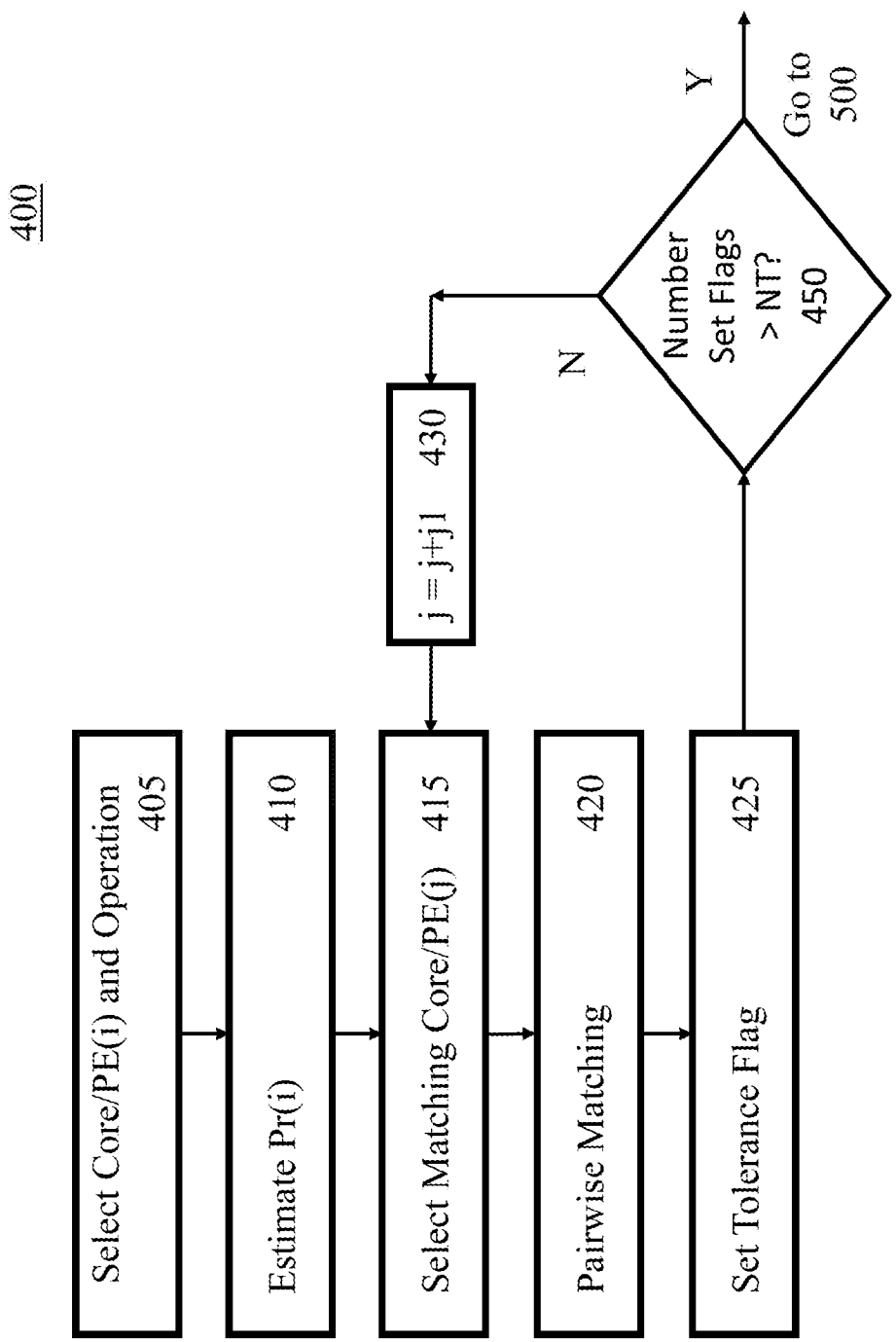
FIG. 4 is a flow chart of one preferred method of determining a per-core reliability.

FIG. 4 is a flow chart of one preferred method 400 of determining per-core reliability, Pr(i) 230.

The process 400 begins by selecting 405 a PE(i) 150 and an operation 220, o(k), to be performed by that PE(i) 150.

An estimate 410 of Pr(i) is made in step 410. The estimate 410 of Pr(i) is stored in a memory location, e.g. a register, for example a memory location 230.

A PE(j) is then selected 415 to create a pair of PE's, PE(i) and PE(j), whose initial results will be compared.

A pairwise matching 420 is performed in step 420. In the pairwise matching 420, the following steps are performed:

Using arbitrary operands (e.g. a and b), the operation, o(k), 220 is performed by both PE(i) and PE(j).

If the operation 220, "a o(k) b", is the same for both PE(i) and PE(j), a match counter, "mc" is incremented for each of PE(i) and PE(j).

An interaction counter, "ic", is also incremented for both PE(i) and PE(j).

A calculation determines the percent of matching pairwise comparisons of the total comparisons, for example "mc/ic" for each PE. The estimate 410 of Pr(i) is replaced by the calculation as follows:

$$Pr(i)=mc/ic$$

Step 425 sets a tolerance flag if the previous value Pr(i) in the register, e.g. 230, is within a pairwise tolerance, ε, of the current value of the register 230.

Step 450 checks the total number of tolerance flags. If the total number of tolerance flags is greater than an acceptable number, NT, the process 400 ends and goes to process 500. If step 450 finds the total number of tolerance flags is less than the acceptable number, NT, another processor, PE(j), is selected 430, e.g. the index "j" is incremented and a new PE(j) is in the pair [PE(i), PE(j)] for the pairwise matching step 420.

In some preferred embodiments, the PE(i) can be compared to itself in the pairwise match 420, i.e. i=j.

To summarize this preferred embodiment, pairwise matches are done between pairs of PEs for a given operation 220 using arbitrary operands for each of the comparisons. The percent of matches/total comparisons, or "total match percentage" is determined, e.g. "mc/ic" for each PE. For each PE, when this "total match percentage" is equal within a pairwise tolerance, ε, over NT number of comparisons, Pr(i) for the operation 220 is set to its total match percentage.

In a preferred embodiment, the total number of tolerance flags, NT, is independent of the number of operations but tunable in the hardware by the user. For example, if the user is aware of a functional relationship that justifies a particular value, the user can input that particular value.

The process 400 is typically performed off-line, e.g. before the system 100 starts executing any application. The process 400 can use actual data or synthetically generated data sets.

Figure 5:
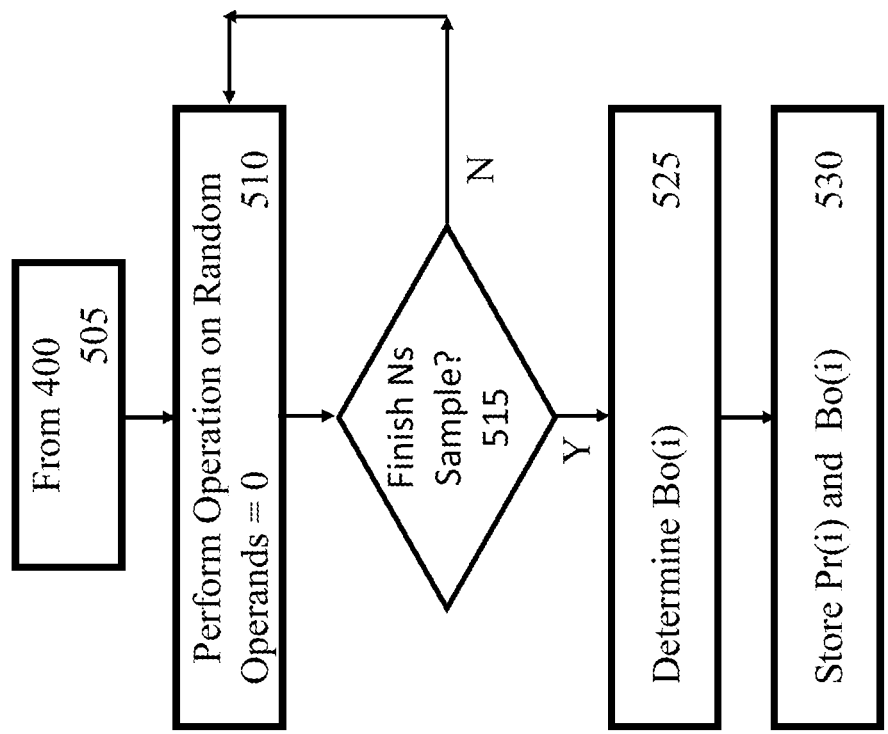
FIG. 5 is a flow chart of one preferred method of determining a per-core mean of faulty values.

FIG. 5 is a flow chart of one preferred method 500 of determining per-core mean, Bo(i), 240 of faulty values.

Once process 400 completes, control is passed 505 to process 500. Process 500 determines the value 240 of the per-PE mean of faulty values, Bo(i) for a given operation 220 of a given PE(i).

In a preferred embodiment, for a given operation 220, step 510 uses random operands to perform the operation 220 where the correct result, c, of the operation 220 is known to be zero. A number, Ns, of operations 220 is chosen to be performed.

Step 510 performs the operation 220 on a first set of operands. The results are stored in a memory.

Step 515 checks if Ns number of operations 220 have been performed. If not, a new set of operands is chosen and step 510 is re-executed. If Ns operations 220 are completed, the value of Bo(i) is determined.

Step 525 determines the value of Bo(i) by taking the mean of all the Bo(i) calculation results. For example, all results of the Bo(i) calculations are added together and divided by Ns.

If there were no faulty results, all resulting calculations for Bo(i) would be zero and Bo(i)=0. If there are faulty results, the per-PE mean of faulty values (per-PE mean), Bo(i) has a non-zero value.

In step 530 stores the values of Pr(i) and Bo(i), e.g. in locations 230 and 240, respectively, in the data structure 125. See step 330.

Figure 6:
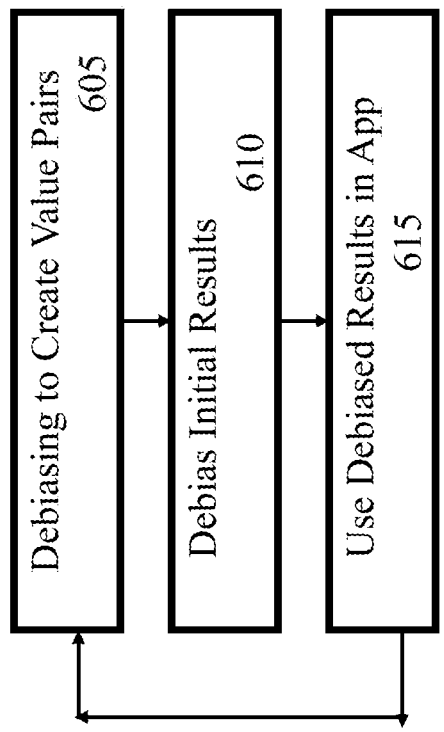
FIG. 6 is a flow chart of one preferred method of executing one or more applications on a system with debiased value pairs.

FIG. 6 is a flow chart 600 of one preferred method of executing one or more applications on a system 100 with debiased value pairs.

In step 605, the value pairs (230, 240) are created by performing processes 400 and 500. In a preferred embodiment, the value pairs (230, 240) are determined off-line, e.g. with real or synthetic data. The value pairs (230, 240) are stored in their respective locations in the data structure 125 as described above.

In step 610, the value pairs (230, 240) are used to debias the respective initial result (initial computed result) 350 determined by the system 100 to create the debiased initial result 360 during the execution of one or more application programs.

In step 615, the debiased initial results 360 replace the initial result 350 and are used as the correct values during the execution of the application(s) on the system 100.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer system comprising:
two or more processing engines (PE), each PE capable of performing one or more operations on one or more operands, for each operation performed by the PE, the operation producing an initial result, at least one or more of the operations being unreliable;
one or more data structures storing a debiasing value pair for each operation performed by each of one or more PEs in the system, the debiasing value pair being a per-PE reliability and a per-PE mean;
a de-biaser that selects a selected debiasing value pair that is associated with a respective operation performed on a respective PE, the selected debiasing value pair used to transform the initial result of each operation into a debiased result,
wherein the debiased result is an expected value equal to a correct output, the correct output being the initial result the respective operation would have been produced if the respective operation performed was reliable, and wherein the computer system uses the debiased result instead of the initial result.

2. A system, as in claim 1, where the per-PE reliability is a constant equal to the probability the respective PE performs the respective operation to produce the correct output.

3. A system, as in claim 1, where the per-PE mean is a constant equal to the mean value of a distribution of faulty initial results produced by the respective operation performed by the respective PE.

4. A system, as in claim 3, where the per-PE reliability and per-PE mean are independent of the operands.

5. A system, as in claim 1, where one or more of the PEs is one or more following: a processor within a computer, a processor within a server, a core within a chip, a central processing unit (CPU), a special purpose processor, a floating point unit (FPU), a multiply-accumulate (MAC) engine, a graphical processing unit (GPU), and a Basic Linear Algebra Subroutine (BLAS) accelerator.

6. A system, as in claim 1, that performs one or more of the following applications: Basic Linear Algebra Subroutines (BLAS), matrix-vector arithmetic, linear algebra, machine learning (ML), and deep learning DL), and neural network calculations.

7. A system, as in claim 1, where the one or more of per-PE reliability values is determined using one or more of the following: a plurality of offline sampled compute checks from a real data set, a plurality of offline sampled compute checks from a synthetic data set, and a plurality of pair-wise compute checks.

8. A system, as in claim 1, where one or more of the per-PE mean values is determined by taking the mean of the initial results of a plurality of operations that have the correct output equal to zero.

9. A system, as in claim 1, where the operations include one or more of the following: addition, subtraction, multiplication, division, bit shifting, matrix operations, and any derivations of the foregoing.

10. A system, as in claim 1, where over a large number of computations the system performance achieves an overall system expected result within a tolerance even though one or more of the PEs performs one or more of the operations unreliably.

11. A system, as in claim 10, where the overall system expected result is the correct result.

12. A system, as in claim 11, where the tolerance is selected by a user.

13. A method of debiasing a computer system, the computer system having two or more processing engines (PE), each PE capable of performing one or more operations on one or more operands, each operation performed by the PE producing an initial result, at least one or more of the operations being unreliable, the method comprising the steps of:
based on an identification of the PE and the operation, retrieving a debiasing value pair from one or more data structures, the debiasing value pair being a per-PE reliability value and a per-PE mean value;
using the debiasing value pair, debiasing the initial result to create a debiased result; and
replacing the initial result with the debiased result to transform the computer system to use the debiased results when executing one or more applications.

14. A method, as in claim 13, where the debiasing value pair are determined off-line using one or more of the following datasets: actual data and synthetically generated data.

15. A method, as in claim 13, where the values in the debiasing value pair are updated while the system is executing one or more of the applications.

16. A method, as is claim 13, where an expected outcome of executing one or more applications approaches a correct outcome as the number of operations increase even though one or more of the operations executed by one or more PEs is faulty.

17. A method, as in claim 16, where the number of operations exceeds 10^3.

18. A method of determining a debiasing value pair, the debiasing value pair being a per-PE reliability value and a per-PE mean value, the method comprising the steps of:
for one or more operations on random operands, executing a pairwise comparison of initial results of a plurality of pairs of processing engines (PEs), each pair including a target PE;
determining a running total match percentage for the target PE;
determining a number of comparisons for which the total matched percentages is within a pairwise tolerance of another; and
when the number of comparisons exceeds a threshold, setting the per-PE reliability value to the total match percentage.

19. A method, as in claim 18, further comprising the steps of:
repeatedly performing an operation with random operands with a known result that should be zero to produce a test result;
finding the mean of the test results; and
setting the per-PE mean value equal to the mean.

20. A method, as in claim 19, further comprising the steps of:
determining an initial result by performing one of the operations on the target PE;
determining the per-PE reliability value and a per-PE mean value for the operation performed by the target PE;
debiasing the initial result to create a debiased result by calculating:

debiased result=initial result*per-PE reliability value+per-PE mean value; and replacing the initial result with the debiased result when a computer system is executing one or more applications, and
wherein the computer system uses the debiased result instead of the initial result.

* * * * *